United States Patent [19]

Audran et al.

[11] 4,255,492
[45] * Mar. 10, 1981

[54] MAGNETIC RECORDING CRYSTALS, PROCESS FOR PRODUCING SAME, AND MAGNETIC RECORDING WEBS USING SAME

[75] Inventors: Roger G. L. Audran, Vitry-sur-Seine; Bernard J. Pingaud, Vincennes, both of France

[73] Assignee: Eastman Kodak Company, Rochester, N.Y.

[ * ] Notice: The portion of the term of this patent subsequent to Dec. 23, 1992, has been disclaimed.

[21] Appl. No.: 522,810

[22] Filed: Nov. 11, 1974

Related U.S. Application Data

[63] Continuation of Ser. No. 230,915, Mar. 1, 1972, abandoned, which is a continuation-in-part of Ser. No. 74,533, Sep. 22, 1970, abandoned.

[30] Foreign Application Priority Data

Sep. 25, 1969 [FR] France ............................... 69 32741
Mar. 16, 1971 [FR] France ............................... 71 09090

[51] Int. Cl.$^3$ .............................................. C01G 49/06
[52] U.S. Cl. .................................. 428/694; 252/62.56; 252/62.6; 252/62.62; 252/62.63; 423/634; 428/900
[58] Field of Search ................. 252/62.56, 62.6, 62.62, 252/62.63; 423/633, 634; 106/304; 428/539, 900

[56] References Cited

U.S. PATENT DOCUMENTS

| | | | |
|---|---|---|---|
| 2,558,302 | 6/1951 | Marcot et al. ......................... | 106/34 |
| 3,075,919 | 1/1963 | Gruber et al. ............... | 252/62.56 X |
| 3,288,563 | 11/1966 | Klomp et al. ................. | 252/62.56 X |
| 3,399,142 | 8/1968 | Conley ............................ | 423/634 X |
| 3,720,618 | 3/1973 | Toda et al. ......................... | 252/62.56 |
| 3,843,773 | 10/1974 | Pingaud ........................ | 252/62.56 X |

FOREIGN PATENT DOCUMENTS 756608  3/1971  Belgium .

OTHER PUBLICATIONS

Audran et al "Chem Abstract", vol. 74, 1971, 143916s.

Primary Examiner—Jack Cooper
Attorney, Agent, or Firm—B. D. Wiese

[57] ABSTRACT

A process for preparing acicular gamma ferric oxide (maghemite) crystals exhibiting excellent magnetic recording properties is disclosed. These acicular gamma ferric oxide crystals are new materials and can be used in magnetic media such as magnetic tapes to obtain a low level of white noise without sacrificing other electroacoustic properties. The crystals are basic in character, contain alkali metal ions and have an acicularity ratio of at least 15, often 15 to 40. These crystals are prepared under very carefully controlled reaction conditions, as more fully described in the following specification. In general, however, the process involves (1) reacting ferrous salt with a stoichiometric excess of an alkali hydroxide under non-oxidizing conditions and at a temperature below about 60° C. while substantially avoiding local excesses of the ferrous salt, to form an aqueous dispersion of ferrous hydroxide particles, (2) introducing oxygen into the dispersion to convert the ferrous hydroxide particles to crystals of alpha ferric oxide hydrate, (3) discontinuing introduction of the oxygen into the dispersion, (4) boiling the dispersion to obtain further crystallization of the alpha ferric oxide hydrate crystals and subjecting the crystals to dehydration, reduction and oxidation to form gamma ferric oxide crystals. As indicated in the specification, failure to observe the reaction conditions set out in the specification and claims deleteriously affects the magnetic recording properties of the gamma ferric oxide crystals. Additional doping ions such as alkaline earth metal ions and/or other ions of metals such as cobalt, nickel, chromium, zinc, manganese or calcium can be introduced into the gamma ferric oxide crystals during their preparation to further improve properties for magnetic recording. Products which are useful in magnetic recording such as magnetic tapes, discs, drums and striped motion picture film containing the acicular gamma ferric oxide crystals are disclosed.

25 Claims, 5 Drawing Figures

MAGNETIC RECORDING CRYSTALS, PROCESS FOR PRODUCING SAME, AND MAGNETIC RECORDING WEBS USING SAME

This application is a continuation of application Ser. No. 230,915, filed Mar. 1, 1972, now abandoned which in turn is a continuation-in-part of our U.S. application Ser. No. 74,533, filed Sept. 22, 1970 now abandoned, (based on our French application No. 6932741 filed in France Sept. 25, 1969).

BACKGROUND OF THE INVENTION

1. Field of the Invention

The present invention concerns magnetic recording, and particularly concerns novel and improved magnetic recording members carrying layers of maghemite (gamma $Fe_2O_3$) iron oxide crystals, the characteristics of which are adapted in particular to the realization of high-performance magnetic records such as tapes, discs, drums, and striped motion picture film. Additionally, the invention also relates to a novel process for producing such maghemite iron oxide crystals, for producing goethite crystals as precursors thereof, and to novel maghemite crystals as articles of manufacture.

2. The Prior Art

The utilization of magnetic recording in various technical fields is increasing, and efforts are being made to extend more and more the range of its possibilities. It is particularly desired, in the field of sound recording as well as in the field of image recording, to have available magnetic layers that are capable of storing signals of shorter and shorter wavelengths, without sacrificing the quality of reproduction of the signals.

It is known that the end capabilities of magnetic webs and surfaces, such as tapes, discs, drums, and striped motion picture films, for the recording and reproduction of sounds, images or other signals are closely connected with the properties of the magnetizable iron oxides employed.

The most frequently used magnetizable oxide is acicular gamma ferric oxide (maghemite $Fe_2O_3$) particles of a length below one micron, obtained from hydrated ferric oxide crystals (goethite FeO.OH). The goethite, after dehydration to alpha $Fe_2O_3$ (hematite), and then reduction to $Fe_3O_4$ (magnetite), is mildly oxidized to gamma $Fe_2O_3$ (maghemite) having a cubic lattice, with the final maghemite particles retaining the dimensions and general appearance of the precursor goethite particles.

Electron micrographs of prior art gamma $Fe_2O_3$ particles show that they have on the average a length-to-width ratio, called their acicularity ratio or acicularity, between 5 and 10 to 1. The shape of these particles is often poorly defined, which gives them a rough aspect. Certain shapes suggest the existence of twin crystals. The particle size distribution is heterogeneous, and one notes in particular the presence of fragments of poorly defined shape.

In some samples, a substantial amount of non-ferromagnetic alpha $Fe_2O_3$, can be detected along with the ferromagnetic gamma $Fe_2O_3$, when examining X-ray diagrams. The presence of alpha $Fe_2O_3$ can be explained by local increases in temperature (or hot spots within the mass of magnetite particles) during the oxidation of $Fe_3O_4$ into gamma $Fe_2O_3$, which reaction is strongly exothermic. Iron oxide such as just described, having a low acicularity ratio and comprising heterogenous particles, will not produce magnetic tapes displaying optimum properties.

Moreover, for certain applications such as studio recordings and cartridges designed for the reproduction of music, magnetic tapes using iron oxides of the prior art do not exhibit as low a level of zero signal or white noise as desired. By white noise is meant the noise which exists in the absence of modulation, but subsequent to high-frequency erasure and recording bias. The level of white noise is reduced when one reduces the size of iron oxide crystals, but this improvement has been generally obtained in the past at the expense of other electroacoustical properties, particularly at low frequencies, and one is forced to compromise.

A procedure for producing iron oxide crystals of improved characteristics is described in copending U.S. application Ser. No. 36,385 filed May 11, 1970, now abandoned, by Bernard-Jean Pingaud, one of us. That application describes dispersing, in the absence of an oxidizing agent, a solution of ferrous salt in an alkaline solution in an amount exceeding the stoichiometric quantity necessary to convert all the iron salt to iron hydroxide, in such a way that the final concentration of alpha FeO.OH is below 15 g/l and that the final concentratin of dissolved alkaline hydroxide is below 60 g/l of solution. Absence of an oxidizing agent is assured by maintaining an atmosphere of inert gas above the reactants. After oxidizing to geothite by blowing air therethrough for 24 hours or more, the dispersion is brought to boiling and boiled for at least 6 hours so as to complete crystallization of the goethite.

When the ferrous hydroxide is precipitated in alkaline medium with only ordinary stirring, a localized precipitation of Fe $(OH)_2$ having an acid character is created adjacent the area where the iron salt enters the alkaline solution, ie., where there is a localized excess of iron sulfate, which permits the forming of goethite only when one oxidizes the intermediate products very slowly. It is one of the reasons why, in the previous Pingaud process, the oxidizing of $Fe(OH)_2$ in alkaline medium must be spread over at least 24 hours so as not to cause the formation of undesirable compounds, such as magnetite or lepidocrocite.

SUMMARY OF THE INVENTION

An object of the present invention is to provide an improved process that makes it possible to obtain novel fine goethite alpha FeO.OH crystals and fine maghemite gamma $Fe_2O_3$ crystals of a length below 0.5 micron (and preferably below 0.4 micron) rapidly and with practically no undesirable contamination of compounds or crystalline rearrangements. After dehydration of the goethite to alpha $Fe_2O_3$, reduction to $Fe_3O_4$ and oxidation to gamma $Fe_2O_3$, e.g. by the process described in British Pat. No. 640,438 and in Phys. Chem. Solids 23, p. 545–554 (1962), improved stabilized maghemite gamma $Fe_2O_3$ crystals result which are unusually advantageous as ferrimagnetic layers for magnetic recording members. Such novel crystals are produced by the process steps of our parent U.S. application Ser. No. 74,533, now abandoned, but since filing that application we have further examined and characterized the novel products as will appear hereinafter.

The reactions for converting goethite to maghemite are as follows:

$$2\text{ alpha-FeO} \cdot \text{OH} \longrightarrow \text{alpha-Fe}_2\text{O}_3 + \text{H}_2\text{O}$$
(goethite) (hematite)

$$3\text{ alpha-Fe}_2\text{O}_3 + \text{H}_2 \longrightarrow 2\text{ Fe}_3\text{O}_4 + \text{H}_2\text{O}$$
(magnetite)

$$2\text{ Fe}_3\text{O}_4 + \tfrac{1}{2}\text{O}_2 \longrightarrow 3\text{ gamma Fe}_2\text{O}_3$$
(maghemite)

Our process comprises first preparing fine acicular alpha FeO.OH crystals by dispersing an aqueous solution of a ferrous salt in an aqueous alkaline solution, with minimum exposure to air and in the absence of any other oxidizing agent. One way to do this is to bring the ferrous salt solution toward a lamellar suction zone created in the midst of the alkaline solution where it undergoes a lamellar stretching such that it pentrates the alkaline solution on a very large surface area instead of in a limited area of excessively high ferrous salt concentration. When using such a technique, purging of the reaction vessel or blanketing of the solution with a non oxidizing gas are not required. By an alkaline solution we mean a solution of a compound which will react with the ferrous salt to precipitate ferrous hydroxide, eg., an hydroxide of one of the alkali metals such as sodium or potassium hydroxide.

This is accomplished by a device which makes it possible to violently disperse and intermix the ferrous salt rapidly while the liquid-air interface is maintained sufficiently calm that an undesirable amount of air is not introduced into the solution from the ambient atmosphere, which avoids any localized imbalance of reagent concentrations, one in another, and which also can be used for the subsequent introduction of oxygen, e.g., as pure oxygen or as air into the dispersion. There are many ways of conducting such a controlled reaction. A suitable device is described in French Pat. No. 1,157,156 and the corresponding U.S. Pat. No. 2,996,287. This device, herein called a rotatory saucer, comprises two coaxial cones, opposed at their bases and very close to each other, carried on a hollow shaft, with openings which enable communication between the interior of the shaft and the immersing liquid volume between the two opposed cones, and thence through the open area on the periphery located between the two cones. The shaft is connected to a motor device which imparts to the shaft and to the cones a rotary movement (a rotational speed of about 2800 rpm for cones of about 8 inch diameter is suggested as a starting point from which an optimum value can be ascertained). This assures a centrifugal effect on the fluids that are in contact with the walls of the cones. Suitable valves permit adding liquids or introducing air and other gases through the hollow shaft. First the solution of ferrous salt is admitted to the hollow shaft, and thereupon the liquid particles escaping from this shaft and from between the cones in this area can be rapidly and widely dispersed in the liquid mass wherein the cones turn.

Of course, if other techniques for achieving intermixing are employed, an oxygen free atmosphere above the reactants can also be assured by maintaining a blanket of inert gas such as $N_2$ or A over the surface of the reactants so that premature oxidation does not occur.

After rapid dispersion of the solution of ferrous salt into the alkaline solution, we oxidize the precipitated ferrous hydroxide so that the nucleation and growth of the crystalline nuclei proceed with great uniformity. In order to assure a constant speed to this reaction, air is next admitted to the hollow shaft, whence it is sucked into and dispersed in the suspension by means of the rotation of the shaft and more especially of the attached saucer. The air must be admitted in progressively increasing volumes because the thickening of the suspension makes the solid-gas exchange and the diffusion of the oxygen progressively less efficient. When oxidation is completed, the dispersion or suspension is brought to boiling and boiled for a short time, such as one half hour or one hour, in order to complete and perfect the crystallization of goethite. Then the dispersion is filtered and the crystals of goethite are washed and dried.

The conditions for precipitation and oxidation of the ferrous hydroxide with the aid of the rotatory saucer depend on various factors, such as the concentration of the ferrous solution, the excess of the alkaline solution, the duration of the precipitation and of the oxidation, as well as the reaction temperature.

The concentration and quantity of the starting ferrous solution must be such that the alpha FeO.OH content of the oxidized dispersion does not exceed 15 g. per liter, ie., the initial ferrous salt must be stoichiometrically equivalent to 15 g/l or less of maghemite. Beyond this limit, the length of the goethite needles is above 0.5 micron. For example, with a concentration of 18 g/l an a 2 hour period of oxidation, the needles have a median length of 0.65 micron. The length of the needles further increases if the duration of oxidation is longer.

The excess of the alkaline hydroxide in solution that is used with respect to the necessary stoichiometric quantity to precipitate all the ferrous salt as ferrous hydroxide must be about 500% or more at the end of the reaction ie., there must remain in solution about 5 times or more of the alkaline hydroxide than was required to convert all the iron salt to the hydroxide. The concentration of the dissolved alkaline compound does not remain the same during the precipitation of the ferrous hydroxide, and during its oxidation, since it is advantageous to dilute the slurry before beginning the oxidation. In one embodiment, the $Fe(OH)_2$ compound is precipitated in an alkaline solution containing at least 250 g/l of alkaline compound, the readjustment to a concentration that will provide no more than 15 g/l of the finally produced FeO.OH being done by adding water after all of the $Fe(OH)_2$ is precipitated.

A precipitation carried out with a lower excess of alkaline compound (as in application Ser. No. 36,385, now abandoned) leads to the forming of complexes which are then oxidizable to alpha FeO.OH only after excessively long periods of oxidation, and the final properties of the crystals so obtained are poorer than those of the crystals prepared with an excess of alkaline solution on the order of about 500% or more.

The undesirable phenomenon is still more pronounced if the alkaline solution is poured into the acidic ferrous solution, instead of vice versa; the precipitation of the $Fe(OH)_2$ begins under these conditions in an acid medium and is completed in a basic medium. Such a process requires that subsequent oxidation be spread over one hundred hours or so in order that the complexes that are formed do not decompose to products other than geothite.

One may use as the alkaline solution, hydroxides of any of the alkali metals chosen from group 1a of the periodic table, eg., caustic soda or caustic potash. One may use as the ferrous salt any salt or hydrate thereof that is sufficiently soluble to make the starting solution, and which will not complex the ferrous hydroxide. Ferrous chloride having four molecules of water, or else ferrous nitrate, or else ferrous sulfate having seven molecules of water are common examples.

The precipitation of ferrous hydroxide must be done rapidly (advantageously in less than 10 minutes) and with minimum exposure to air and certainly without the introduction of any air.

When the oxidation is carried out at constant oxidation rates, through control of the rate of air admission, and the maintenance of constant temperatures, and alkaline hydroxide concentrations, the length of the needles increases as the precipitation and oxidation periods increase from several minutes to several hours. Moreover, an increasing heterogeneity of the crystals is noted as the precipitation and oxidation periods are made longer. This latter phenomenon derives from the fact that the initially precipitated hexagonal ferrous hydroxide slowly oxidizes to acicular alpha FeO.OH. After a time, the two compounds are both present. The operating conditions are then such that there is simultaneously enlargement of the existing needles and formation of new microcrystalline acicular nuclei, a process which increases the heterogeneity of the product.

The time required to complete the oxidation of the ferrous hydroxide is a very important factor. It depends on the rate at which oxygen is introduced in the suspension, and on the concentration of the precipitated product.

Oxidation must start only about 30 minutes after terminating the inflow of the ferrous solution so that all the ferrous hydroxide may be precipitated. In order to obtain homogeneous crystals of goethite, the growth of the crystalline nuclei must progress smoothly, which requires control of the oxidation rate in the manner described above.

The duration of oxidation must not exceed three hours where goethite needles having an average length below about 0.5 microns are desired. For longer durations, the goethite needles attain a length of 0.5 micron, or greater (eg., 0.8 micron acicular particles in five hours of oxidation). The final magnetic properties of the longer gamma $Fe_2O_3$ particles obtained from such longer goethite crystals are not as good as those of the shorter crystals we obtain with shorter oxidation times.

The temperature during precipitation and oxidation must be lower than 60° C. When the temperature increases, the length of the crystals does not change significantly, but the diameter of the crystals increases and the acicularity ratio decreases correspondingly. At a still higher temperature, cubic magnetite crystals are formed directly with the length of the cube edge being about the length of the acicular particles that would have formed at lower temperatures.

When the oxidation is completed, the suspension of the alpha FeO.OH particles in its strongly alkaline mother liquor is brought to boiling. This operation facilitates the diffusion of the alkaline ions from the mother solution into the goethite crystal lattice. After filtering, washing and drying of the crystals, and then transforming them into gamma $Fe_2O_3$ (iron sesquioxide), this compound so prepared has a stability of the magnetic properties that is superior to that of previously known oxides, including the oxides prepared according to the process of U.S. application Ser. No. 36, 385, now abandoned.

The above procedure produces crystals having sodium ions in the crystal lattice (or potassium or other alkali metal if potassium hydroxide or other alkali hydroxide is used in the initial alkaline solution). Other doping ions can be introduced to the crystals. For example, calcium ions can be introduced in the washing step by washing the crystals with water to which calcium ions have been added, such as calcium chloride or bicarbonate. Other doping ions such as those of cobalt, nickel, chromium, zinc or manganese can be introduced by dissolving suitable water soluble compounds (eg., sulfates or nitrates) in the initial ferrous salt solution in appropriate quantities.

The present invention also concerns novel ferric ion oxide products in the form of fine particles of a well-defined uniform crystalline shape (crystallographic structure), a uniform narrow particle size distribution as hereinafter defined, a high degree of acicularity (eg., 15 to 40 or higher), and improved thermal stability, to provide tapes and other magnetic media having a low level of white noise without sacrifice of other electroacoustic properties.

The first three properties relate both to goethite ferric oxide hydrate, and to maghemite gamma ferric oxide. Thermal stability, the fourth, relates to gamma ferric oxide, with the gamma-to-alpha transition temperature being raised to a temperature higher than the transition temperature for maghemite crystals previously known, in fact even higher than the Curie temperature which has been almost impossible even to determine previously because the magnetic gamma form has changed to the non magnetic alpha form before reaching the Curie temperature. This improvement of the present invention is particularly significant because it makes possible the thermal printing of magnetic recordings which usually is done in the neighborhood of the Curie temperature.

Ferrimagnetic maghemite crystals prepared from goethite crystals having a definite transition temperature, called the Curie temperature or point at which they lose their ferrimagnetic properties. The intensity of remanent magnetization of a ferrimagnetic body immediately after removal from a Field H varies as a function of the temperature. With the crystals prepared from the particles of geothite obtained according to the invention, as the temperature increases the intensity of magnetization decreases, and one notes that the Curie temperature at which the crystals become non magnetic, ie., have zero remanent magnetization, is approximately 645° C. Upon cooling crystals from a temperature above the Curie point, eg., from 700° C., still under the influence of a magnetic field, one detects at the Curie point the re-establishment of the remanent magnetization and the crystals again become ferrimagnetic.

Our goethite and maghemite iron compounds are both further characterized in that they contain ions of at least one of the alkali metals (eg., sodium, potassium) to the extent of at least 0.04 meq/gm with or without at least one of the alkaline-earth metals (e.g. calcium), in such form that they impart to said oxides a basic nature; and in that their crystals display an acicularity ratio at least equal to 15. It is also advantageous to have present additional ions of one or more of the metallic elements which can exist in an appropriate positive valence and are of a diameter to permit inclusion within the gamma $Fe_2O_3$ lattice. Among such elements are cobalt, nickel, chromium, zinc and manganese. The latter are preferably introduced by adding suitable soluble salts to the original ferrous salt solution and coprecipitating these with ferrous hydroxide.

By non-oxidizing conditions in this application, such that there is an adverse effect upon subsequent complete oxidation to goethite, we mean that oxygen is excluded from contact with the reacting solutions to such an extent that at the end of the precipitation the ferric ion content in the dispersion is less than 1 % by weight of the ferrous ion content, as ascertained by potentiometric measurements and analysis.

THE SPECIFIC EMBODIMENTS

The following examples illustrate the invention

EXAMPLE 1

In a 10 liter tank, one introduces at 40° C. 3 liters of aqueous sodium hydroxide solution containing 250 g/l of NaOH (6.2 gm. moles/liter). One then flows into the sodium hydroxide solution within 8 minutes, by means of the motor driven hollow shaft and the dispersing saucer of the above mentioned French and U.S. patents, 1 liter at 25° C. of an aqueous ferrous sulfate solution containing 190 g/l of $FeSO_4$ $7H_2O$ (0.68 gm. moles/liter). The excess of NaOH at end of precipitation is thus about 1280%. There is no air introduction because the rotatory saucer does not create any vortex or surface turbulence of the reaction medium (also true in subsequent examples). After the entire ferrous solution has been introduced, one adds 2.5 liters of water at 40° C.

Thirty minutes after the end of the precipitation, one incorporates progressively, still by means of the dispersing saucer, progressively increasing amounts up to 15 liters per hour of air which is finely dispersed in the suspension. After 2 hours and 30 minutes of oxidation, the reaction is completed. The solution is then brought to boiling and boiled for 1 hour, filtered, the filter cake carefully washed with water, and the goethite crystals are dried. The dried product is then converted to maghemite gamma $Fe_2O_3$ by dehydration, reduction, and reoxidation.

TABLE I

| | |
|---|---|
| Average size of particles | 0.4 micron |
| Acicularity ratio: length/diameter | 20 to 25 |
| Curie temperature, of gamma $Fe_2O_3$ | 650° C. |
| Coercive field, of gamma $Fe_2O_3$ | 390 oersteds |
| Remanent magnetization, of gamma $Fe_2O_3$ | 585 gauss |

EXAMPLE 2

In a 10 liter container, one introduces 3.5 liters of water and 500 g of NaOH (12.5 gm. moles) calculated to provide 730% excess. After complete solution, one stabilizes the temperature at 40° C. Then, one rapidly pours into the solution, by means of the stirring and dispersion system described in the foregoing French and U.S. patents, 1 liter of aqueous ferrous sulfate solution containing 220 g/l of $FeSO_4 .7H_2O$ (0.76 gm. moles/liter), and then adds 2.5 liters of water at 40° C. Forty minutes after the end of the precipitation, one blows into the suspension, always using the aforecited stirring system, compressed air at rates of flow progressively increasing from 5 l/h to 20 l/h. After 2 hours and 40 minutes of oxidation, when the reaction is completed, one brings the reaction mixture to boiling and boils for one hour, filters, washes with water, and then dries the resulting goethite yellow iron oxide crystals.

The length of the resulting crystals is less than 0.5 micron, and averages about 0.4 micron, their acicularity ratio is between 20 and 25.

After thermal treatment of these geothite needles by dehydration into alpha $FE_2O_3$ at 270° C., reduction into $Fe_3O_4$ at 350° C. and then reoxidation carried out at 300° C., one obtains a gamma ferric oxide the characteristics of which are described in the following Table II, wherein alkalinity is expressed in milliequvalents per gram (meq/g), and the content of sodium and of calcium ions is expressed as weight in grams of Na and Ca per 100 g. of oxide.

TABLE II

| Alkalinity in meq/g | Analysis Content of Na | Content of Ca | Curie Point | Temperature of Transition gamma-alpha | Coercivity in oersteds |
|---|---|---|---|---|---|
| 0.04 | 0.06 | 0 | not observable | 610° C. | 348 |

EXAMPLE 3

According to the procedure of Example 2, one prepares in a 10 liter container 3.5 liters of an aqueous solution containing 145 g/l (3.6 gm. moles/liter) of NaOH at 40° C., calculated to provide 820% excess. One rapidly pours in through the rotatory saucer 1 liter of aqueous solution containing 200 g (0.69 gm. moles/liter) of ferrous sulfate. After dilution, and oxidation of the resulting precipitate as in Example 2, one brings the dispersion to boiling and boils for one hour, filters, washes with water containing 100 mg/l of calcium ions added as calcium chloride, then dries the resulting goethite crystals.

The length of the resulting needles is about 0.4 micron and they have an acicularity ratio between 20 and 25.

After thermal treatment as in Example 2, one obtains a gamma ferric oxide compound the characteristics of which are shown in Table III, wherein the contents of Na and Ca ions are expressed as grams per 100 grams of oxide.

TABLE III

| Alkalinity in meq/g | Analysis Content of Na | Content of Ca | Curie Point | Temperature of transition gamma-alpha | Coercivity in oersteds |
|---|---|---|---|---|---|
| 0.06 | 0.08 | 0.45 | 640° C. | 700° C. | 370 |

One uses the thusly prepared oxide for the manufacture of a magnetic tape. The latter, measured as half-track (on half the width of the tape) according to standard DIN 45 513, volume 3 (Deutsche Industrie Norm—a W. German standard for determining the acoustical properties of magnetic tapes), shows a reduction of 1.5 to 2dB in balanced white or zero signal noise compared with the best low white noise level tapes in the trade, all other properties, particularly at low frequencies, being at least equal.

EXAMPLE 4

In a 10 liter container, one prepares 3.5 liters of an aqueous solution containing 157 g/l (3.9 gm. moles/-liter) of NaOH, calculated to provide 567% excess. One pours in rapidly 1 liter of an aqueous solution containing 225 g of ferrous sulfate and 10 g of cobaltous sulfate. After dilution, and oxidation as in Example 2, one brings to boiling, filters, washes with water containing 100 mg/l of calcium ions added as calcium bicarbonate, then dries the resulting goethite crystals.

One obtains goethite needles, doped with cobalt and containing traces of calcium ions, of a length of from 0.3 to 0.4 micron having an acicularity ratio of 30 to 35. After thermal treatment one obtains gamma $Fe_2O_3$ particles which have the characteristics shown in Table IV. The contents of Na, Ca and Co ions in the sample are expressed as weight in grams per 100 g of oxide.

TABLE IV

| Alkalinity in meq/g | Analysis | | | Curie Point | Temperature of transition gamma-alpha | Coercivity in oersteds |
|---|---|---|---|---|---|---|
| | Content of Na | Content of Ca | Content of Co | | | |
| 0.04 | 0.055 | 0.4 | 3 | 645° C. | 760° C. | 770 |

The gamma ferric oxide according to the invention displays a basic reaction. This basicity can be determined by dispersing the iron oxide by means of an energetic stirring in glacial acetic acid. The analysis is effected by potentiometry by means of a titrated solution of perchloric acid in nitromethane. The alkalinity measured on the gamma $Fe_2O_3$ samples is at least equal to 0.04 meq/g (milliequivalents per gram) of oxide, and generally is between 0.04 and 0.2 meq/g.

This alkalinity is characteristic of products obtained according to our parent U.S. patent application Ser. No. 74,533. It is enhanced by introducing the calcium ions, which play an important role in the thermal stability of our novel gamma $Fe_2O_3$. The calcium is apparently precipitated in the form of $Ca(OH)_2$ on the goethite, and the Ca ions remain when the goethite is converted to maghemite. The amount is advantageously between 0.25 and 2% by weight of calcium on the basis of the iron oxide.

With calcium ions present, the Curie point of the gamma ferric oxide can always be observed at a temperature of 640° C. to 650° C.; and the transition point of gamma to alpha is raised to a higher temperature such as 700°–760° C.

The transition point of gamma to alpha is determined by differential thermal analysis, eg. by means of the Differential Thermal Analyser, type 906, manufactured by E. I. DuPont de Nemours, provided with the 1200° C. high-temperature cell. One operates on 20 mg of substance, the thermocouples being directly in the sample, without the use of an intermediate protective crucible, and the reference being alumina. The heating rate is adjusted to 20° C./minute and the sensitivity to temperature difference at 0.008 mV/cm. (millivolts per centimeter).

Figure 2:
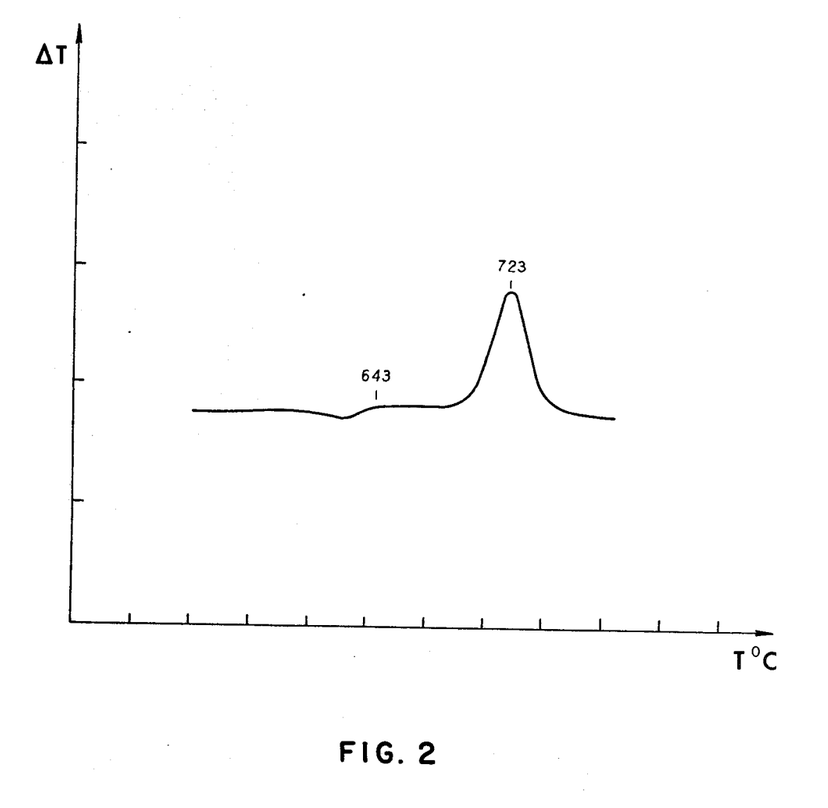
FIG. 2 is a thermogram of a sample of maghemite powder according to the invention, with differential temperature between sample and an alumina reference plotted against temperature, in °C., showing both the Curie temperature and the gamma-to-alpha $FE_2O_3$ transition temperature.

FIG. 2 represents the interesting portion of the thermogram of a sample of gamma ferric oxide containing calcium ions according to the invention. One observes first of all a displacement of the basic line which is characteristic of second order transformations and corresponds to the Curie zone, which is crossed at 643° C. In this example, one notes the peak conversion of gamma to alpha at 723° C.

When stabilized with calcium ions in accordance with the present invention, the temperature of the magnetic gamma $Fe_2O_3$ iron oxide can be raised up to 650° C. and above, without decomposition to non magnetic alpha $Fe_2O_3$ occurring (an irreversible reaction). The products obtained in the course of reoxidation of $Fe_3O_4$ during conversion of goethite to maghemite are thus more easily prepared free of alpha $Fe_2O_3$ since there is a greater tolerance to localized overheating without conversion of the oxide to alpha $Fe_2O_3$, even in the case of local increases of temperature or hot spots, this being of particular interest for manufacture on an industrial scale. Such local increases in temperature occur, in particular, through the mass effect inside clumps of oxide which are formed in certain types of reactors wherein the thermal treatments which convert goethite FeO.OH into maghemite gamma $Fe_2O_3$, are carried out.

Figure 1A:
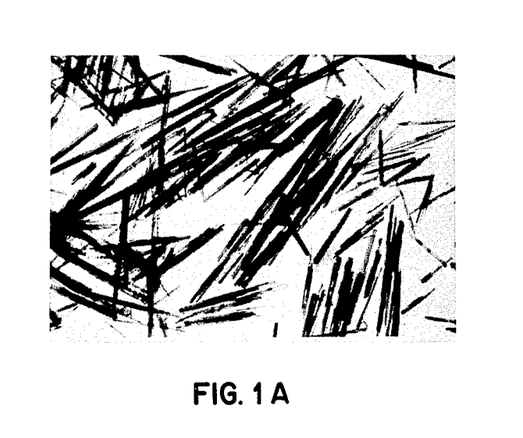
FIGS. 1A and 1B are electron micrographs at the same magnification of masses of goethite crystals and maghemite crystals, respectively, produced by the process of the present invention.
Figure 1B:
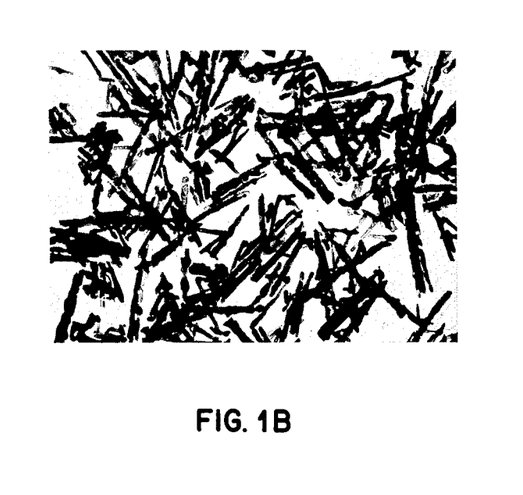

The ferric oxides (whether goethite or maghemite) produced according to the invention appear in the form of similar acicular particles having well defined contours. The electron micrograph represented in FIG. 1A shows the general aspect of the goethite crystals according to the invention, which appear in the form of prisms the edges of which are sharp and well defined. FIG. 1B shows the similar appearance and size of the corresponding maghemite gamma $Fe_2O_3$ crystals.

Figure 1C:
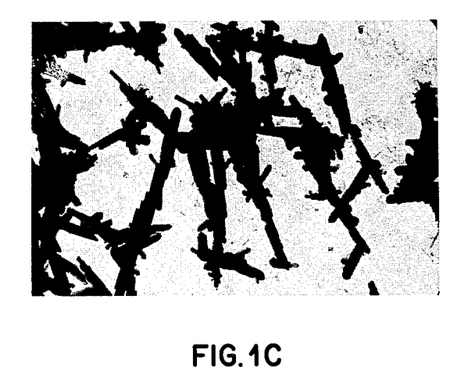
FIGS. 1C and 1D are electron micrographs at the same magnification as FIGS. 1A and 1B of masses of goethite crystals and maghemite crystals, respectively, which are commercially available as prior art.
Figure 1D:
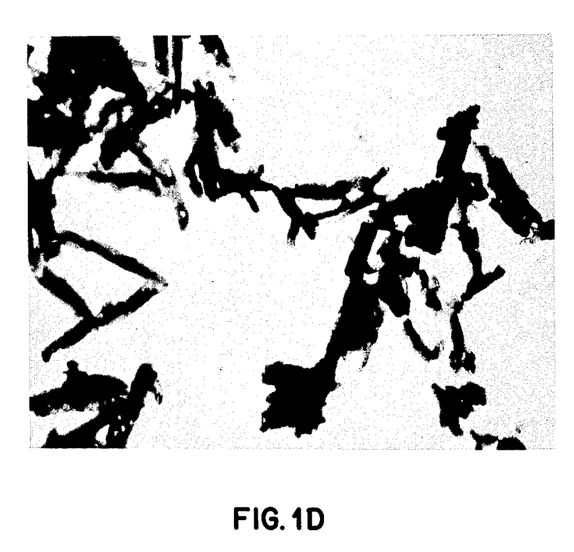

FIGS. 1C and 1D, respectively, represent a prior art commercial goethite, and a prior art maghemite gamma ferric oxide prepared from such a commercial goethite. One sees that the prior art oxide particles have poorly defined contours, a coarse aspect, are less homogenous in size, and are less acicular than either of the oxides according to the invention.

A glance at the micrographs of FIGS. 1A and 1B reveals the homogeneity in the sizes of our novel crystals. This homogeneity can be established by counting particles of the same length, and by the contour of the distribution curves. This operation is done, preferably, on the nonmagnetic intermediate geothite crystals, as its crystals are more easily individually recognizable.

The particle size distribution of goethite crystals by size follows a normal logarithmic equation:

$$\frac{dN}{dl} = N\sqrt{\frac{K}{\pi}} \frac{1}{l} \exp\left[-K(\log \frac{l}{L_m})^2\right]$$

wherein N represents the number of crystals of length l, $L_m$ represents the average value of the length, and K the coefficient of polydispersion. This coefficient K is above 2 for the oxides according to the invention.

For special applications, one may modify the magnetic properties of the gamma ferric oxide according to the invention, by doping with one or more ions of such elements as cobalt, nickel, zinc, manganese or chromium and many others. Such ions cause a desirable increase in acicularity ratio when coprecipitated simultaneously with the ferrous hydroxide during the first phase of goethite preparation.

Moreover, when the gamma ferric oxide according to the invention contains cobalt, it imparts an extremely high coercivity or coercive field.

Table V below shows the range of coercivities which it is possible to secure with the gamma ferric oxide modified by means of cobalt and prepared by the teachings of this invention by coprecipitation with $Fe(OH)_2$ from a starting solution containing both ferrous and cobaltous salts such as sulfates or chlorides. The cobalt content of the oxide samples is expressed as weight in grams of cobalt per 100 grams of oxide.

TABLE V

| Cobalt content of the oxides - % | 0 | 0.5 | 1 | 1.5 | 1.7 | 2 | 3 | 4 |
|---|---|---|---|---|---|---|---|---|
| Coercivity in oersteds | 340 | 353 | 375 | 405 | 428 | 475 | 771 | 1070 |

Those oxides, the coercivity of which is between 400 and 600, are of particular interest when a high definition is required; consequently they can be used advantageously for image-recording video tapes. Those oxides the coercivity of which is above 600 are particularly suitable for the preparation of matrix tapes which are necessary in contact duplicating.

For the manufacture of a web such as magnetic tape with the gamma ferric oxide according to the invention, one disperses said oxide in a solution of a polymeric binder in a volatile solvent for the binder, and then applies the resulting dispersion as a thin layer on a carrier and allows the solvent to evaporate. Among binders that are useful for production in accordance with the invention are in particular vinyl acetate and vinyl chloride copolymers; vinylidene chloride and acrylonitrile copolymers; acrylic and/or methacrylic ester copolymers; polyvinyl butyral; butadiene and styrene copolymers; terpolymers of acrylonitrile, vinylidene chloride and maleic anhydride or malemide, cross-linked or non-cross-linked copolycondensates such as polyamides, polyurethanes, polyesters, etc., or mixtures of these binders. Many other binders with similar chemical and physical properties are well known and possible. One obtains particularly advantageous results by using a vinyl acetate and vinyl chloride copolymer, partially hydrolized and optionally cross-linked with an isocyanate, or by using polyurethanes, or else a mixture of these binders. The amount of these binders proportionally to the magnetic oxide is between approximately 20 and approximately 40% by weight based on the magnetic oxide. Suitable solvents are methylethylketone, methylisobutylketone, ethyl acetate, butyl acetate, cyclohexanone, and mixtures thereof.

Magnetic recording tape according to the invention can also contain other additives in the magnetic layer such as oleic acid or any other dispersing agent in order to facilitate the dispersion, a lubricant such as the carbonic ester compounds described in U.S. application Ser. No. 134,833, now abandoned, (eg. ethyl cetyl carbonate, ethyl lauryl carbonate, didodecyl carbonate), conductive pigments such as carbon in order to avoid static, or else loads such as colloidal silica, without adverse modification of the improved characteristics.

The magnetic layer according to the invention can be applied to flexible films such as supports of cellulose triacetate, polyvinyl chloride, or polyester such as ethyleneglycol polyterephthalate. It can also serve for coating any other support.

According to the invention, acicular gamma ferric oxide having particle lengths less than 0.5 micron, and even more advantageously of the order of 0.4 micron or less, makes it possible to produce tapes for studio recordings and for cartridges designed for the reproduction of music, which do not have the previously indicated disadvantages for tapes manufactured by means of the previously known oxides. The oxide according to the invention makes possible the manufacture of magnetic tapes, for the aforecited applications, the properties of which are at least equal to those of the best tapes in the trade, and with an improvement over such known tapes of approximately 2dB in the white noise level.

The invention has been described in detail with particular reference to preferred embodiments thereof, but it will be understood that variations and modifications can be effected within the spirit and scope of the invention.

We claim:

1. Gamma ferric oxide consisting essentially of crystals that have an acicularity ratio of at least 15 and an average crystal length less than 0.5 micron and which comprise alkali metal ions that impart a basicity of at least 0.04 meq. per gram to said oxide.

2. Gamma ferric oxide according to claim 1 having a basicity in the range of 0.04 to about 0.2 meq. per gram.

3. Gamma ferric oxide according to claim 2 also containing doping ions of cobalt, nickel, chromium, zinc, manganese or calcium.

4. Gamma ferric oxide according to claim 3 in which the acicularity ratio is in the range of about 15 to about 40 and the alkali metal ions are sodium or potassium ions.

5. A product for magnetic recording comprising a support and a layer of non-magnetic binder in which there is dispersed gamma ferric oxide as defined in claim 3.

6. A product for magnetic recording according to claim 5 where the doping ions are cobalt ions.

7. Gamma ferric oxide according to claim 1 also comprising alkaline earth metal ions in a concentration of about 0.25 to about 2 percent, by weight, based on oxide.

8. Gamma ferric oxide according to claim 7 in which said alkaline earth metal ions are calcium ions.

9. Gamma ferric oxide according to claim 8 in which the alkali metal ions are sodium or potassium ions.

10. Gamma ferric oxide according to claim 9 also containing doping ions of cobalt, nickel, chromium, zinc or manganese.

11. Gamma ferric oxide according to claim 10 where said doping ions are cobalt ions.

12. Gamma ferric oxide according to claim 1 having a narrow particle size distribution such that its coefficient of polydispersion is above 2.

13. A product for magnetic recording comprising a support and gamma ferric oxide as defined in claim 1.

14. A product for magnetic recording comprising a support and a layer of non-magnetic binder in which there is dispersed gamma ferric oxide as defined in claim 1.

15. A process for preparing acicular gamma ferric oxide crystals for magnetic recording which comprises adding under non-oxidizing conditions, at a temperature below about 60° C., an aqueous solution of ferrous salt to an aqueous solution of a stoichiometric excess of an alkaline hydroxide while substantially avoiding local excesses of said ferrous salt, to form an aqueous dispersion of ferrous hydroxide particles, said alkaline hydroxide being present in said aqueous dispersion in a concentration of at least about a 500% stoichiometric excess;

introducing oxygen into said dispersion at a temperature of about 20° C. to about 60° C. for a period of time sufficient to convert said ferrous hydroxide particles to crystals of alpha ferric oxide hydrate, the concentrations of ferric oxide hydrate formed in the oxidized dispersion being no more than about 15 grams per liter;

discontinuing introduction of said oxygen into said dispersion;

boiling said dispersion to obtain further crystallization of said alpha ferric oxide hydrate crystals; and subjecting said crystals to dehydration, reduction and oxidation to form gamma ferric oxide crystals.

16. A process according to claim 15 which comprises directing said solution of ferrous salt to a suction zone created in the midst of said alkaline hydroxide solution where said ferrous salt solution undergoes a lamellar stretching such that it penetrates into said alkaline hydroxide solution in the form of a sheet of large surface area.

17. A process according to claim 16 in which the aqueous dispersion of ferrous hydroxide particles is formed in less than about 10 minutes and the duration of said introduction of oxygen is less than about 3 hours.

18. A process according to claim 15 in which said alkaline hydroxide is an alkali metal hydroxide.

19. A process according to claim 18 in which the oxygen is introduced into the dispersion by directing it to a suction zone created in the midst of the dispersion.

20. A process according to claim 15 in which said ferrous salt solution contains ions of cobalt, nickel, chromium, zinc, manganese or calcium.

21. A process according to claim 15 which comprises the additional steps of recovering said alpha ferric oxide hydrate crystals from said dispersion and washing said crystals with an aqueous solution containing alkaline earth metal ions.

22. A process according to claim 21 in which the ferrous salt solution contains ions of cobalt, nickel chromium, zinc, manganese or calcium.

23. A process according to claim 21 in which said alkaline earth metal ions are calcium ions.

24. A process according to claim 15 in which the duration of said introduction of oxygen is less than about 3 hours and said process comprises the additional steps of recovering said alpha ferric oxide hydrate crystals from said dispersion and washing said crystals with an aqueous solution containing alkaline earth metal ions.

25. A process according to claim 24 in which said alkaline earth metal ions are calcium ions.

* * * * *